United States Patent
Kanno

(10) Patent No.: US 11,115,554 B2
(45) Date of Patent: Sep. 7, 2021

(54) POWER SUPPLY CONTROL DEVICE AND IMAGE FORMING APPARATUS CAPABLE OF DETECTING A FAILURE OF A MAIN POWER SWITCH

(71) Applicant: CANON KABUSHIKI KAISHA, Tokyo (JP)

(72) Inventor: Takashi Kanno, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/829,847

(22) Filed: Mar. 25, 2020

(65) Prior Publication Data

US 2020/0322499 A1 Oct. 8, 2020

(30) Foreign Application Priority Data

Apr. 5, 2019 (JP) .............................. JP2019-073025

(51) Int. Cl.
*G06F 1/3206* (2019.01)
*H04N 1/00* (2006.01)

(52) U.S. Cl.
CPC ....... *H04N 1/00891* (2013.01); *G06F 1/3206* (2013.01); *H04N 1/00907* (2013.01)

(58) Field of Classification Search
None
See application file for complete search history.

(56) References Cited

U.S. PATENT DOCUMENTS

| | | | | |
|---|---|---|---|---|
| 2014/0104634 A1* | 4/2014 | Tanaka | ............... | G06K 15/4055 358/1.13 |
| 2014/0160516 A1* | 6/2014 | Maruhashi | ......... | H04N 1/00896 358/1.14 |
| 2016/0381239 A1* | 12/2016 | Hasegawa | .......... | H04N 1/00891 358/1.14 |
| 2019/0356801 A1* | 11/2019 | Okuma | .............. | H04N 1/00392 |

FOREIGN PATENT DOCUMENTS

JP 2003-15780 1/2003

* cited by examiner

*Primary Examiner* — Henok Shiferaw
(74) *Attorney, Agent, or Firm* — Venable LLP

(57) ABSTRACT

A power supply control device includes a switch to output a switch depression signal, which is in a first logic level during a period in which the switch is not depressed, and is in a second logic level during a period in which the switch is depressed, a first power supply to generate a first DC voltage based on AC power, which is supplied from an outside, and to apply the first DC voltage to a predetermined load, and a second power supply configured to generate a second DC voltage based on the AC power irrespective of a state of the switch, and a controller to operate on the second DC voltage, to switch an operation state of the first power supply when the switch depression signal has switched from a first logic level to a second logic level and remains at the second logic level.

11 Claims, 5 Drawing Sheets

POWER SUPPLY CONTROL DEVICE AND IMAGE FORMING APPARATUS CAPABLE OF DETECTING A FAILURE OF A MAIN POWER SWITCH

BACKGROUND OF THE INVENTION

Field of the Invention

The present disclosure relates to a power supply control technology for apparatus, such as an image forming apparatus.

Description of the Related Art

Apparatus, such as an image forming apparatus, each include a main power switch for starting (turning on) and shutting down (turning off) a main body thereof. The apparatus is started or shut down when the main power switch is operated under a state in which a commercial power supply and the apparatus are connected to each other. The apparatus starts power supply from an internal power supply, which is included in the main body, to components in the main body to enter an operable state when being started. The apparatus stops power supply from the internal power supply to the components in the main body when being shut down. As the main power switch, a push switch in which a contact is connected only when the push switch is operated can be used, for example.

The apparatus is controlled by firmware or software so as to be started through an operation on the push switch when the apparatus is in a shutdown state, and to be shut down through an operation on the push switch when the apparatus is in the operable state. The firmware or software is executed by a central processing unit (CPU) to control start and shutdown of the apparatus. The firmware or software cannot normally control start and shutdown of the apparatus anymore when the CPU gets out of control. In this case, an operation on the main power switch when the apparatus is in the operable state cannot stop the apparatus, for example.

In Japanese Patent Application Laid-open No. 2003-15780, there is disclosed a power supply control device capable of addressing the above-mentioned situation and shutting down the apparatus reliably. This power supply control device forcefully stops power supply from the internal power supply to the components when a signal for giving an instruction to stop power supply is not transmitted from the firmware to the internal power supply after a predetermined time period has elapsed since an operation on a main power switch. In this manner, the apparatus is shut down even when the CPU gets out of control.

However, when the main power switch using the push switch itself fails due to an abnormality, the instruction to stop power supply is not transmitted from the main power switch to the CPU anymore. In this case, a situation in which the apparatus is not shut down even when the CPU is in normal operation occurs. In view of the above-mentioned problem, the present disclosure has a main objective to provide a power supply control device capable of detecting a failure of a main power switch.

SUMMARY OF THE INVENTION

A power supply control device of the present disclosure includes: a switch configured to output a switch depression signal, which is in a first logic level during a period in which the switch is not depressed, and is in a second logic level during a period in which the switch is depressed; a first power supply configured to generate a first DC voltage based on AC power, which is supplied from an outside, and to apply the first DC voltage to a predetermined load; a second power supply configured to generate a second DC voltage based on the AC power irrespective of a state of the switch; and a controller configured to operate on the second DC voltage, to switch an operation state of the first power supply in a case where the switch depression signal has switched from the first logic level to the second logic level and thereafter the switch depression signal remains at the second logic level until a first predetermined time period has elapsed, and to output a signal on a failure of the switch in a case where the switch depression signal has switched from the first logic level to the second logic level and thereafter the switch depression signal remains at the second logic level until a second predetermined time period has elapsed, the second predetermined time period being longer than the first predetermined time period.

Further features of the present invention will become apparent from the following description of exemplary embodiments (with reference to the attached drawings).

DESCRIPTION OF THE EMBODIMENTS

An embodiment of the present invention is described with reference to the drawings.

Figure 1:
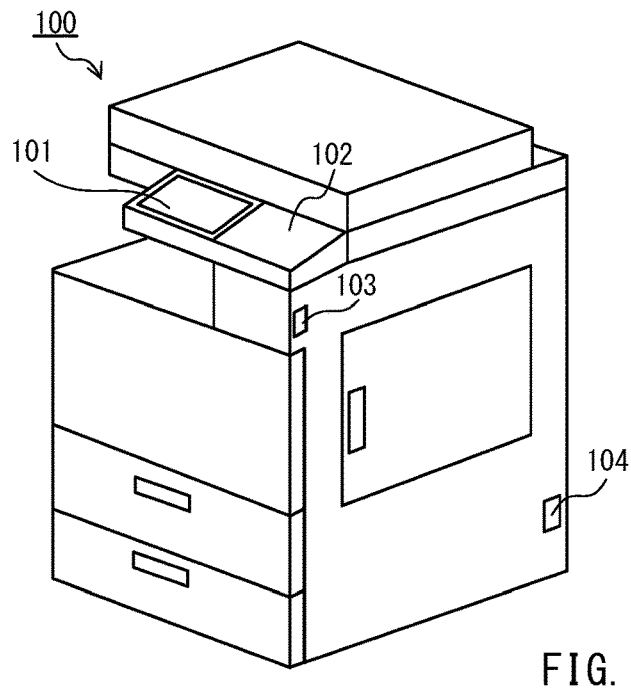
FIG. 1 is an appearance view of an image forming apparatus.

FIG. 1 is an appearance view of an image forming apparatus employing a power supply control device according to an embodiment of the present disclosure. An image forming apparatus 100 includes a power supply portion 104 configured to supply external AC power from a commercial power supply through an outlet, a main power switch 103, an operation panel 102, and a display 101. The operation panel 102 is an input device, through which a user inputs an instruction to the image forming apparatus 100. The display 101 is an output device, on which an operation status, an operating condition, and various messages of the image forming apparatus 100 are displayed. The image forming apparatus 100 is switched in operation state through an operation on the main power switch 103. Through an operation on the main power switch 103, the operation state is switched to an operable state upon startup from a shutdown state, or from the operable state to the shutdown state. The image forming apparatus 100 is configured to form an image on a given sheet in response to an instruction from the user.

Figure 2:
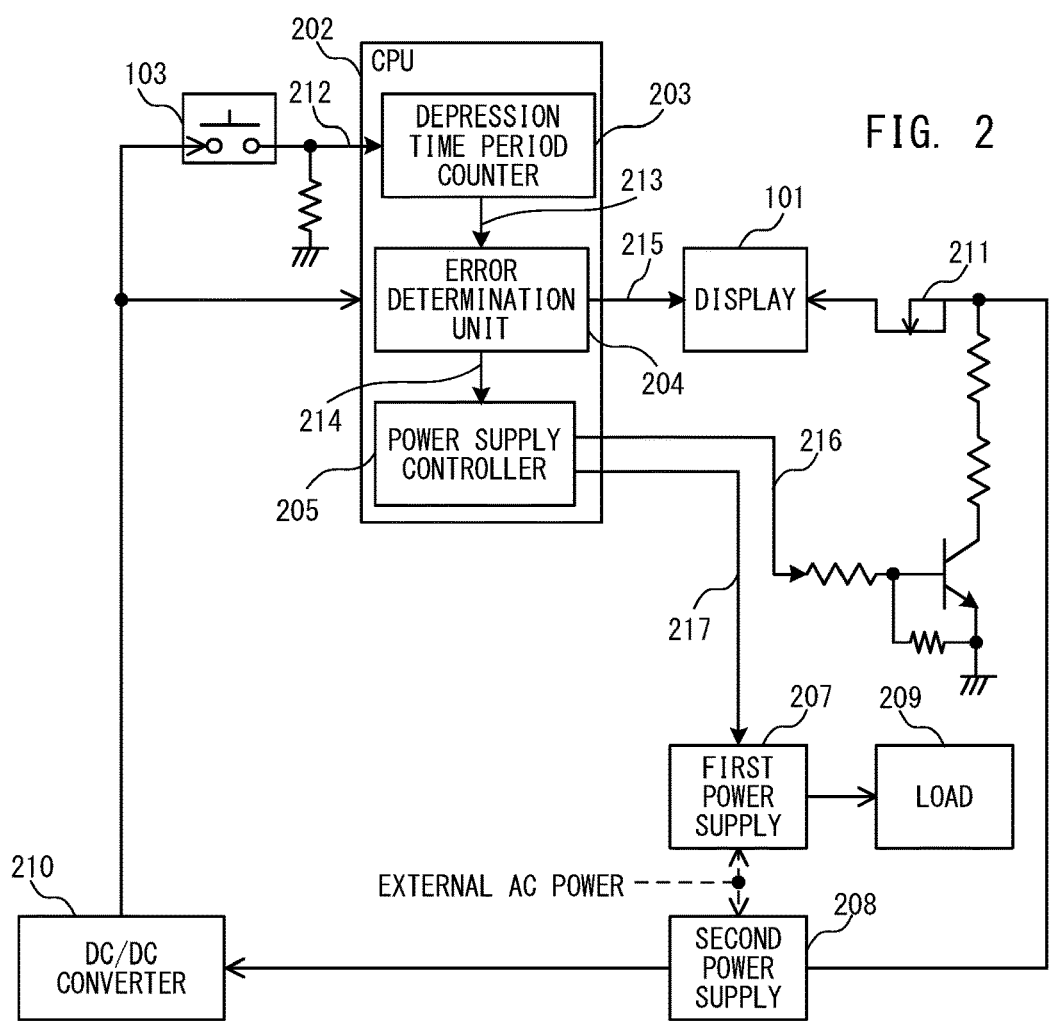
FIG. 2 is an explanatory diagram of a power supply control device.

FIG. 2 is an explanatory diagram of the power supply control device configured to control a power supply system of the image forming apparatus 100. The power supply control device includes a CPU 202, a first power supply 207, a second power supply 208, a DC/DC converter 210, and a power transistor 211. The CPU 202 is a controller configured to execute a predetermined computer program to function as a depression time period counter 203, an error determination unit 204, and a power supply controller 205. The CPU 202 is configured to control operation of the image forming apparatus 100. In this specification, a function of controlling the power supply system by the CPU 202 is described, and a description on other functions is omitted.

To the first power supply 207 and the second power supply 208, the external AC power is supplied from the commercial power supply. The first power supply 207 is controlled in operation by the CPU 202, and is configured to supply power to a load 209, for example, a motor to be used in forming an image. The first power supply 207 in this embodiment is configured to convert the external AC power to generate a DC voltage of 24 V for use inside the apparatus, and to apply the DC voltage to the load 209. The first power supply 207 is configured to start the image forming apparatus 100 in response to an instruction from the CPU 202 based on an operation on the main power switch 103.

The second power supply 208 is configured to operate irrespective of the operation on the main power switch 103, and to supply power to the DC/DC 210. The second power supply 208 in this embodiment is configured to convert the external AC power into a DC voltage of 12 V for use inside the apparatus, and to apply the DC voltage to the DC/DC converter 210. The DC/DC converter 210 is configured to convert the DC voltage of 12 V applied from the second power supply 208 into a DC voltage of 3.3 V, and to supply the DC voltage to the main power switch 103 and the CPU 202. Further, the second power supply 208 can apply the DC voltage of 12 V to the display 101 via the power transistor 211. The power transistor 211 is an energization controller provided on a path through which the DC voltage is supplied from the second power supply 208 to the display 101 to control energization of the display 101 with the DC voltage.

The main power switch 103 is formed of a push switch, and a switch depression signal 212 has a low logic level under a state in which the main power switch 103 is not depressed. The switch depression signal 212 is switched to a high logic level during a period in which the main power switch 103 is depressed. In this embodiment, the DC voltage of 3.3 V is supplied from the DC/DC converter 210 to the main power switch 103. Therefore, during the period in which the main power switch 103 is depressed and conductive, the switch depression signal 212 is at 3.3 V (high logic level). A signal line between the main power switch 103 and the CPU 202 is grounded via a resistor, and hence the switch depression signal 212 is at 0 V (low logic level) during a period in which the main power switch 103 is not depressed.

The CPU 202 is active at all times with the DC voltage of 3.3 V applied from the DC/DC converter 210 irrespective of an operation on the main power switch 103. The CPU 202 is configured to switch the operation state of the image forming apparatus 100 with the switch depression signal 212 acquired from the main power switch 103.

(Operation Upon Normal Startup)

Upon startup of the image forming apparatus 100, the power supply control device operates as follows. This operation is started with depression of the main power switch 103 for startup when the image forming apparatus 100 is in the shutdown state, in which no power is supplied to components of the image forming apparatus 100. In a case where the main power switch 103 is depressed, the switch depression signal 212 at the high level is input from the main power switch 103 to the CPU 202. The switch depression signal 212 is input to the depression time period counter 203 of the CPU 202. The depression time period counter 203 is configured to count a time period during which the switch depression signal 212 is continuously at the high level. A counted time period 213 obtained by the depression time period counter 203 is input to the error determination unit 204. The depression time period counter 203 is configured to continuously perform the counting during a period in which the switch depression signal 212 is at the high level, and to transmit the latest counted time period 213 to the error determination unit 204 during the period.

The error determination unit 204 is configured to compare the counted time period 213 with a predetermined time period (a time period Ton/off (for example, 50 milliseconds)), and to determine whether or not to perform startup processing based on a result of the comparison. For example, the error determination unit 204 performs the startup processing in a case where the counted time period 213 is the time period Ton/off or more, and transmits a power supply control instruction signal 214 for activating the first power supply 207 to the power supply controller 205. In a case where the counted time period 213 is less than the time period Ton/off, the startup processing is not performed.

The power supply controller 205 is configured to enable a first power supply ON signal 217 for activating the first power supply 207 in response to the power supply control instruction signal 214 for activating the first power supply 207. With the first power supply ON signal 217 being enabled, the first power supply 207 applies the DC voltage of 24 V to the load 209. The power supply controller 205 also enables a power transistor ON signal 216 (changes the power transistor ON signal 216 to a high level) in order to put the power transistor 211 into a conductive state. The power transistor 211 becomes conductive in a case where the power transistor ON signal 216 is enabled. When the power transistor 211 becomes conductive, the path through which the DC voltage is supplied from the second power supply 208 to the display 101 passes an electric current to apply the DC voltage of 12 V to the display 101.

In a case where the DC voltage is applied to the load 209 and the display 101 and no other error has occurred, the image forming apparatus 100 performs an initial operation and enters a standby state (operable state) in which various jobs can be received. This completes processing of supplying power to the components by the power supply control device upon startup of the image forming apparatus 100.

(Operation Upon Normal Shutdown)

Upon shutdown of the image forming apparatus 100, the power supply control device operates as follows. This operation is started with depression of the main power switch 103 for shutdown in a case where the image forming apparatus 100 is in the operable state, in which power is supplied to the components of the image forming apparatus 100. In a case where the main power switch 103 is depressed, the switch depression signal 212 at the high level is input from the main power switch 103 to the CPU 202. The switch depression signal 212 is input to the depression time period counter 203 of the CPU 202. As in the startup, the depression time period counter 203 is configured to count a time period during which the switch depression signal 212 is continuously at the high level. The counted time period 213 obtained by the depression time period counter 203 is input to the error determination unit 204. The depression time period counter 203 is configured to continuously perform the counting during a period in which the switch depression signal 212 is at the high level, and to transmit the latest counted time period 213 to the error determination unit 204 during the period.

As in the startup, the error determination unit 204 is configured to compare the counted time period 213 with the time period Ton/off, and to determine whether or not to perform shutdown processing based on a result of the comparison. For example, in a case where the counted time period 213 is the time period Ton/off or more, the error determination unit 204 performs the shutdown processing and transmits the power supply control instruction signal 214 for deactivating the first power supply 207 to the power supply controller 205. In a case where the counted time period 213 is less than the time period Ton/off, the shutdown processing is not performed.

The power supply controller 205 dissembles the first power supply ON signal 217 (changes the first power supply ON signal 217 to a low level) in response to the power supply control instruction signal 214 for deactivating the first power supply 207. The first power supply 207 stops applying the DC voltage to the load 209 when the first power supply ON signal 217 becomes the low level. The power supply controller 205 also changes the power transistor ON signal 216 to a low level in order to cut off (turned off) the power transistor 211. The power transistor 211 is cut off when the power transistor ON signal 216 becomes the low level. When the power transistor 211 is cut off, the application of the DC voltage from the second power supply 208 to the display 101 is stopped. This completes processing of stopping power supply to the components by the power supply control device upon shutdown of the image forming apparatus 100. In the processing of stopping power supply, the second power supply 208 is not deactivated, and the DC voltage of 3.3 V remains being applied to the CPU 202. Therefore, the CPU 202 is active even after the processing of stopping.

(Operation Upon Startup During the Main Power Switch 103 has Failed)

In a case where the main power switch 103 has failed upon startup of the image forming apparatus 100, the power supply control device operates as follows. In a case where the main power switch 103 fails, the logic level of the switch depression signal 212 does not change anymore. In other words, the switch depression signal 212 becomes a signal having a logic level that is always high or low. In a case where the switch depression signal 212 is low, the image forming apparatus 100 is not started. In a case where the switch depression signal 212 is high, the following operation is performed.

Processing of from the first power supply 207 applying the DC voltage of 24 V to the load 209 to the second power supply 208 applying the DC voltage of 12 V to the display 101 is the same as in the case of normal startup. However, the switch depression signal 212 is continuously in the high state. Therefore, the depression time period counter 203 continues counting. The error determination unit 204 compares the counted time period 213 with a predetermined time period (time period Terr (for example, 5 seconds)). The time period Terr is longer than the time period Ton/off. While the counted time period 213 is less than the time period Terr, the error determination unit 204 continues to transmit the power supply control instruction signal 214 for activating the first power supply 207 to the power supply controller 205.

In a case where the counted time period 213 reaches the time period Terr, there is a fear that the main power switch 103 has failed and a contact remains connected. In other words, the switch depression signal 212 is always high. In this case, even when the main power switch 103 is depressed in order to shut down the image forming apparatus 100, the switch depression signal 212 does not change. Therefore, the power supply to the image forming apparatus 100 cannot be stopped. Further, it is uncertain from the outside whether the power supply to the image forming apparatus 100 cannot be stopped due to a failure of the main power switch 103, or the power supply cannot be stopped for other reasons.

In order to resolve the situation in which the power supply cannot be stopped, the error determination unit 204 transmits the power supply control instruction signal 214 for forcefully deactivating the first power supply 207 to the power supply controller 205 in a case where the counted time period 213 reaches the time period Terr. The power supply controller 205 changes the first power supply ON signal 217 to the low level in response to the power supply control instruction signal 214 for forcefully deactivating the first power supply 207. In a case where the first power supply ON signal 217 becomes the low level, the first power supply 207 stops applying the DC voltage to the load 209.

The power transistor 211 is maintained in the conductive state, and the display 101 is active. The error determination unit 204 transmits a display instruction signal 215 indicating that the main power switch 103 has failed to the display 101. Thus, a message which indicates that the main power switch 103 has failed is displayed on the display 101, for example.

(Operation Upon Shutdown During the Main Power Switch 103 has Failed)

In a case where the main power switch 103 has failed upon shutdown of the image forming apparatus 100, the power supply control device operates as follows.

Processing up to the first power supply 207 stopping application of the DC voltage to the load 209 is the same as in the case of normal shutdown. It should be noted, however, that the power transistor 211 is maintained in the conductive state, and the display 101 is active. The switch depression signal 212 is continuously in the high state. Therefore, the depression time period counter 203 continues counting. The error determination unit 204 compares the counted time period 213 with the time period Terr. While the counted time period 213 is less than the time period Terr, the error determination unit 204 continues to transmit the power supply control instruction signal 214 for deactivating the first power supply 207 to the power supply controller 205.

In a case where the counted time period 213 reaches the time period Terr, there is a fear that the main power switch 103 has failed and the contact is always connected. In other words, the switch depression signal 212 is always high. In this case, even when the main power switch 103 is depressed in order to start the image forming apparatus 100 that has been shut down, the switch depression signal 212 does not change. Therefore, the power supply to the image forming apparatus 100 cannot be started. Further, it is uncertain from the outside whether the power supply to the image forming apparatus 100 cannot be started due to a failure of the main power switch 103, or the power supply cannot be started for other reasons.

In order to resolve the situation in which the power supply cannot be started, the error determination unit 204 transmits the display instruction signal 215 indicating that the main power switch 103 has failed to the display 101 in a case where the counted time period 213 reaches the time period Terr. Thus, a message which indicates that the main power switch 103 has failed is displayed on the display 101, for example.

(Processing Upon Startup)

Figure 3A:
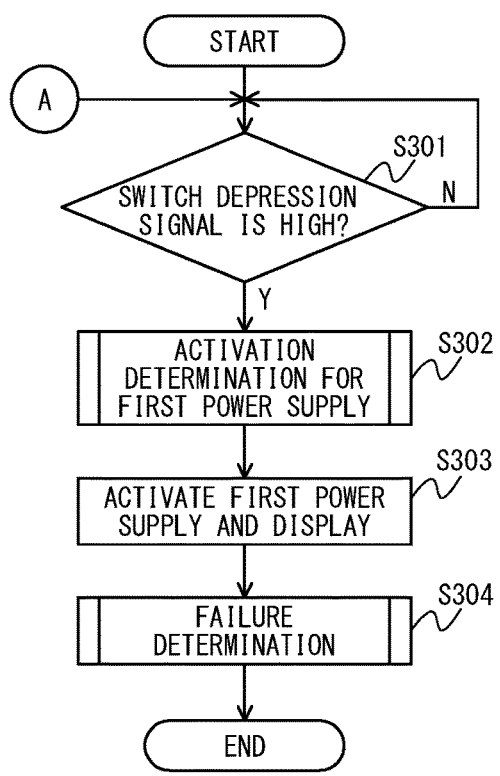
FIG. 3A, FIG. 3B, and FIG. 3C are flow charts for illustrating processing to be performed when the image forming apparatus is started.
Figure 3B:
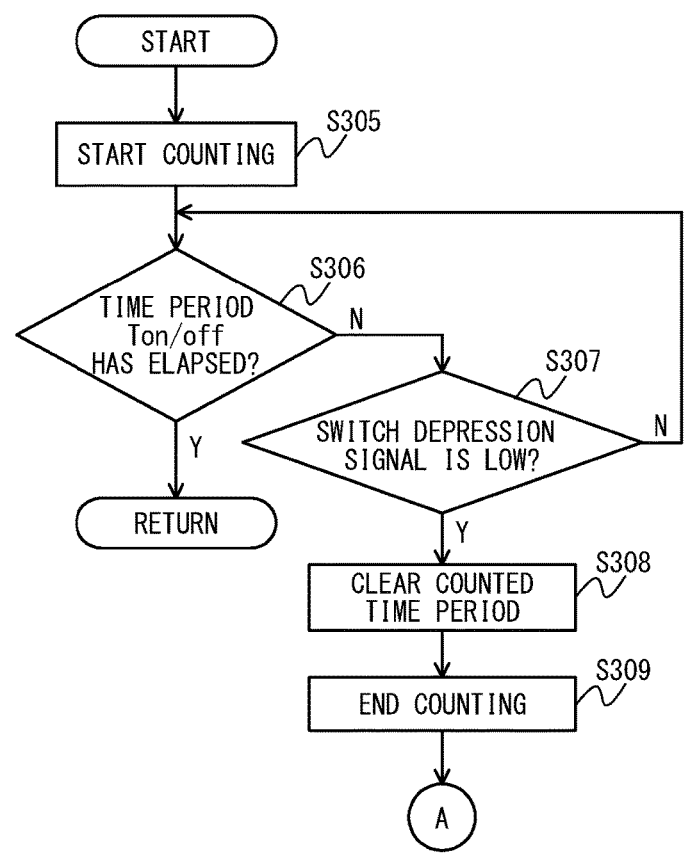
Figure 3C:
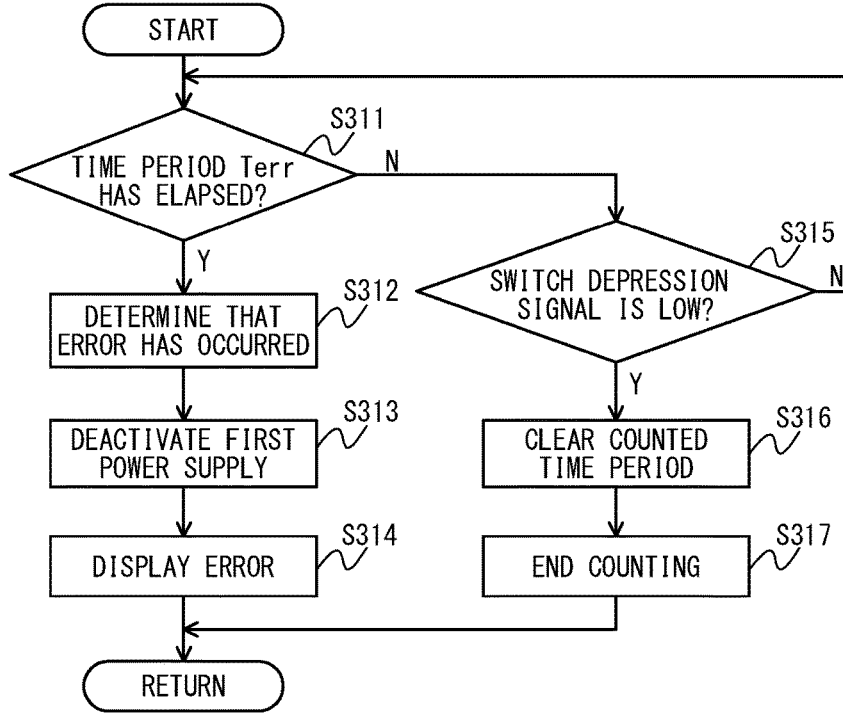

FIG. 3A to FIG. 3C are flow charts for illustrating processing upon startup of the image forming apparatus 100.

The CPU 202 determines whether the main power switch 103 has been depressed and the switch depression signal 212 has changed from low to high (Step S301). In a case where the switch depression signal 212 has changed from low to high (Step S301: Y), the CPU 202 performs activation determination processing for the first power supply 207 (Step S302). In the activation determination processing for the first power supply 207, it is determined whether the main power switch 103 has been depressed for the predetermined time period (time period Ton/off) or more. With this processing, it is possible to prevent such an erroneous operation as in a case where the user has erroneously depressed the main power switch 103, for example.

In FIG. 3B, the activation determination processing for the first power supply 207 in Step S302 is illustrated. The CPU 202 starts counting the time period during which the switch depression signal 212, which is acquired from the main power switch 103, is at the high level by the depression time period counter 203 (Step S305). The error determination unit 204 determines whether the counted time period 213 obtained by the depression time period counter 203 has reached the time period Ton/off or more (Step S306).

In a case where the counted time period 213 has not reached the time period Ton/off (Step S306: N), the CPU 202 determines whether the switch depression signal 212 has changed to the low level (Step S307). In a case where the switch depression signal 212 remains at the high level (Step S307: N), the CPU 202 compares the counted time period 213 and the time period Ton/off again by the error determination unit 204.

In a case where the switch depression signal 212 has changed to the low level (Step S307: Y), the CPU 202 determines that the depressed state of the main power switch 103 has been canceled before the startup processing is started. In this case, the CPU 202 clears the counted time period 213 of the depression time period counter 203 to 0, and ends counting the time period by the depression time period counter 203 (Step S308 and Step S309). The CPU 202 returns to the processing of Step S301 without performing the startup processing. This is processing performed in the case of an erroneous operation by the user.

In a case where the counted time period 213 has reached the time period Ton/off (Step S306: Y), the CPU 202 ends the activation determination processing for the first power supply 207. This is processing performed in a case of an instruction to start intended by the user.

In a case where the main power switch 103 is continuously depressed for the predetermined time period or more and the activation determination processing for the first power supply 207 is ended, the CPU 202 activates the first power supply 207 and the display 101 (Step S303). The CPU 202 enables the first power supply ON signal 217 by the power supply controller 205. In a case where the first power supply ON signal 217 is enabled, the first power supply 207 is activated to apply the DC voltage to the load 209. The CPU 202 also enables the power transistor ON signal 216 (changes the power transistor ON signal 216 to the high level) in order to put the power transistor 211 into the conductive state. In a case where the power transistor 211 becomes conductive, the path through which the DC voltage is supplied from the second power supply 208 to the display 101 passes an electric current to apply the DC voltage to the display 101. In a case where the DC voltage is applied, the display 101 is activated.

Next, the CPU 202 performs failure determination processing for the main power switch 103 (Step S304). In FIG. 3C, the failure determination processing for the main power switch 103 in Step S304 is illustrated.

The CPU 202 determines whether the counted time period 213, which indicates the time period during which the switch depression signal 212 is at the high level, has reached the time period Terr or more (Step S311). In a case where the counted time period 213 is less than the time period Terr (Step S311: N), the CPU 202 determines whether the switch depression signal 212 has changed to the low level (Step S315). In a case where the switch depression signal 212 remains at the high level (Step S315: N), the CPU 202 compares the counted time period 213 and the time period Terr again by the error determination unit 204.

The switch depression signal 212 having changed to the low level (Step S315: Y) means that the depressed state of the main power switch 103 has been canceled after the startup processing. In this case, the CPU 202 clears the counted time period 213 of the depression time period counter 203 to 0, and ends counting the time period by the depression time period counter 203 (Step S316 and Step S317). This is processing performed in the case of normal operation. In the case of normal operation, the switch depression signal 212 changes to the low level after the state of high level has continued for the time period Ton/off or more, and for less than the time period Terr.

In a case where the counted time period 213 has reached the time period Terr (Step S311: Y), the error determination unit 204 of the CPU 202 determines that an error due to a failure of the main power switch 103 has occurred (Step S312). In this case, the CPU 202 changes the first power supply ON signal 217 to the low level in order to deactivate the first power supply 207 (Step S313). In a case where the first power supply ON signal 217 changes to the low level, the first power supply 207 stops applying the DC voltage to the load 209. The error determination unit 204 of the CPU 202 transmits the display instruction signal 215 indicating that the main power switch 103 has failed to the display 101 (Step S314). Thus, the message which indicates that the main power switch 103 has failed is displayed on the display 101, for example. This is processing performed in a case where the main power switch 103 has failed. In a case where the main power switch 103 has failed, the switch depression signal 212 is continuously in the state of high level for the time period Terr or more.

(Processing Upon Shutdown)

Figure 4A:
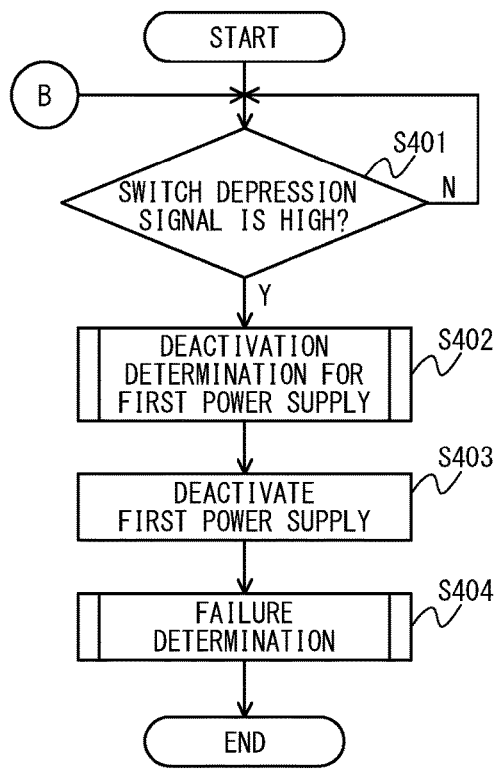
FIG. 4A, FIG. 4B, and FIG. 4C are flow charts for illustrating processing to be performed when the image forming apparatus is shut down.
Figure 4B:
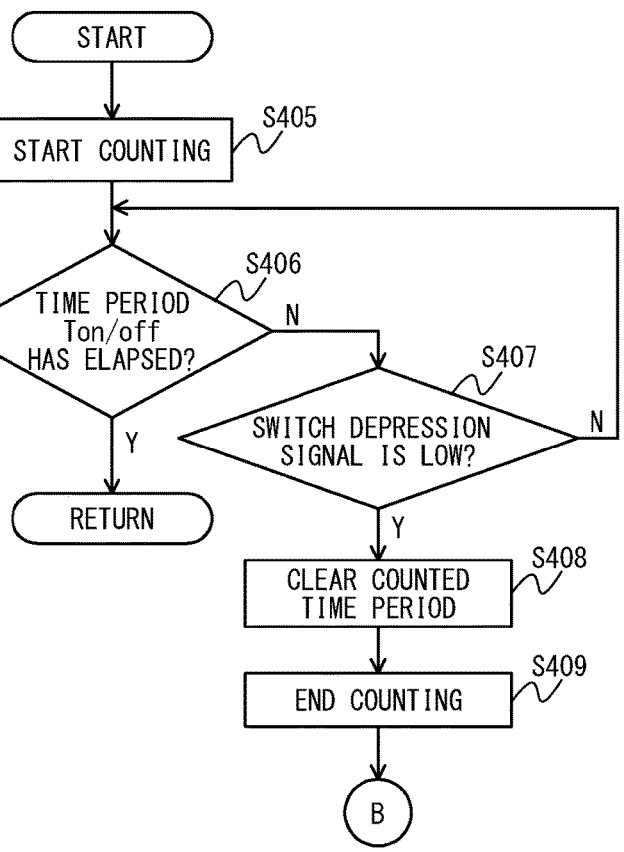
Figure 4C:
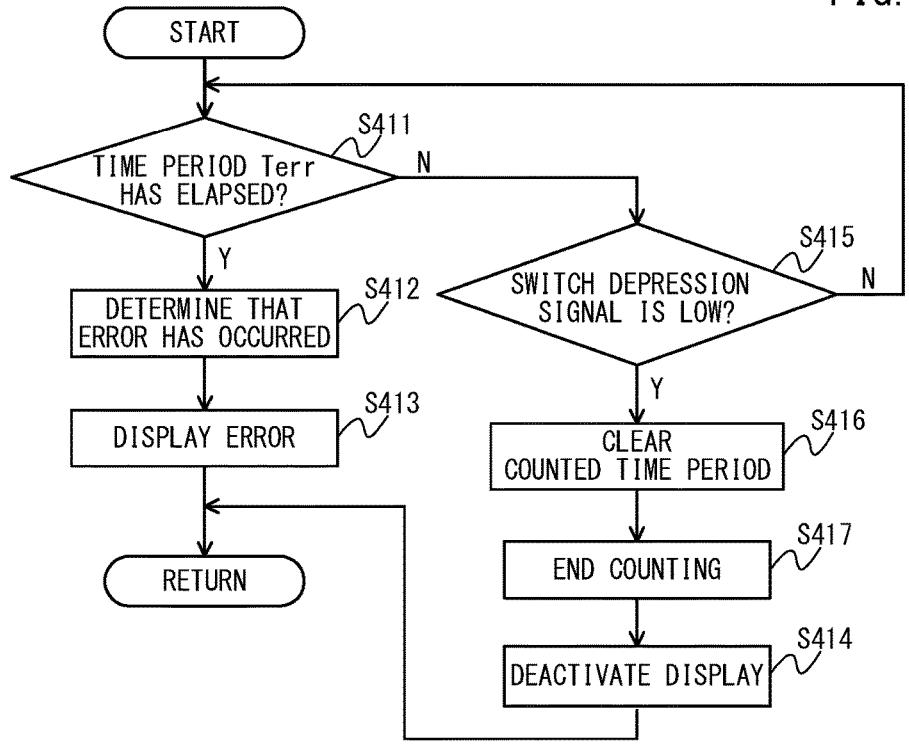

FIG. 4A to FIG. 4C are flow charts for illustrating processing upon shutdown of the image forming apparatus 100.

The CPU 202 determines whether the main power switch 103 has been depressed, and then the switch depression signal 212 has changed from the low level to the high level (Step S401). In a case where the switch depression signal 212 has changed from low to high (Step S401: Y), the CPU 202 performs deactivation determination processing for the first power supply 207 (Step S402). In the deactivation determination processing for the first power supply 207, it is determined whether the main power switch 103 has been depressed for the predetermined time period (time period Ton/off) or more. With this processing, it is possible to prevent such an erroneous operation as in a case where the user has erroneously depressed the main power switch 103, for example.

In FIG. 4B, the deactivation determination processing for the first power supply 207 in Step S402 is illustrated. The CPU 202 starts counting the time period during which the switch depression signal 212, which is acquired from the main power switch 103, is at the high level by the depression time period counter 203 (Step S405). The error determination unit 204 determines whether the counted time period 213 obtained by the depression time period counter 203 has reached the time period Ton/off (Step S406).

In a case where the counted time period 213 has not reached the time period Ton/off (Step S406: N), the CPU 202 determines whether the switch depression signal 212 has changed to the low level (Step S407). In a case where the switch depression signal 212 remains at the high level (Step S407: N), the CPU 202 compares the counted time period 213 and the time period Ton/off again by the error determination unit 204.

The switch depression signal 212 having changed to the low level (Step S407: Y) means that the depressed state of the main power switch 103 has been canceled before the shutdown processing is started. In this case, the CPU 202 clears the counted time period 213 of the depression time period counter 203 to 0, and ends counting the time period by the depression time period counter 203 (Step S408 and Step S409). The CPU 202 returns to the processing of Step S401 without performing the shutdown processing. This is processing performed in the case of an erroneous operation by the user.

In a case where the counted time period 213 has reached the time period Ton/off (Step S406: Y), the CPU 202 ends the deactivation determination processing for the first power supply 207. This is processing performed in a case of an instruction for shutdown intended by the user.

In a case where the main power switch 103 is continuously depressed for the predetermined time period or more, and then the deactivation determination processing for the first power supply 207 is ended, the CPU 202 deactivates the first power supply 207 (Step S403). The CPU 202 changes the first power supply ON signal 217 to the low level by the power supply controller 205. In a case where the first power supply ON signal 217 changes to the low level, the first power supply 207 is deactivated to end applying the DC voltage to the load 209.

Next, the CPU 202 performs failure determination processing for the main power switch 103 (Step S404). In FIG. 4C, the failure determination processing for the main power switch 103 in Step S404 is illustrated.

The CPU 202 determines whether the counted time period 213 corresponding to the time period during which the switch depression signal 212 is at the high level, has reached the time period Terr (Step S411). In a case where the counted time period 213 is less than the time period Terr (Step S411: N), the CPU 202 determines whether the switch depression signal 212 has changed to the low level (Step S415). In a case where the switch depression signal 212 remains at the high level (Step S415: N), the CPU 202 compares the counted time period 213 and the time period Terr again by the error determination unit 204.

The switch depression signal 212 having changed to the low level (Step S415: Y) means that the depressed state of the main power switch 103 has been canceled after the shutdown processing. In this case, the CPU 202 clears the counted time period 213 of the depression time period counter 203 to 0, and ends counting the time period by the depression time period counter 203 (Step S416 and Step S417). The CPU 202 changes the power transistor ON signal 216 to the low level to cut off (turn off) the power transistor 211. In a case where the power transistor 211 is cut off, the application of the DC voltage from the second power supply 208 to the display 101 is ended. Therefore, the display 101 is deactivated (Step S414). This is processing performed in the case where the main power switch 103 operates normally. In the case where the main power switch 103 operates normally, the switch depression signal 212 changes to the low level after the state of high level has continued for the time period Ton/off or more and for less than the time period Terr.

In a case where the counted time period 213 has reached the time period Terr (Step S411: Y), the error determination unit 204 of the CPU 202 determines that an error due to a failure of the main power switch 103 has occurred (Step S412). In this case, the CPU 202 transmits the display instruction signal 215 indicating that the main power switch 103 has failed to the display 101 (Step S413). Thus, the message which indicates that the main power switch 103 has failed is displayed on the display 101, for example. This is processing performed in a case where the main power switch 103 has failed. In a case where the main power switch 103 has failed, the switch depression signal 212 is continuously in the state of high level for the time period Terr or more.

(Timing Charts Upon Startup)

Figure 5A:
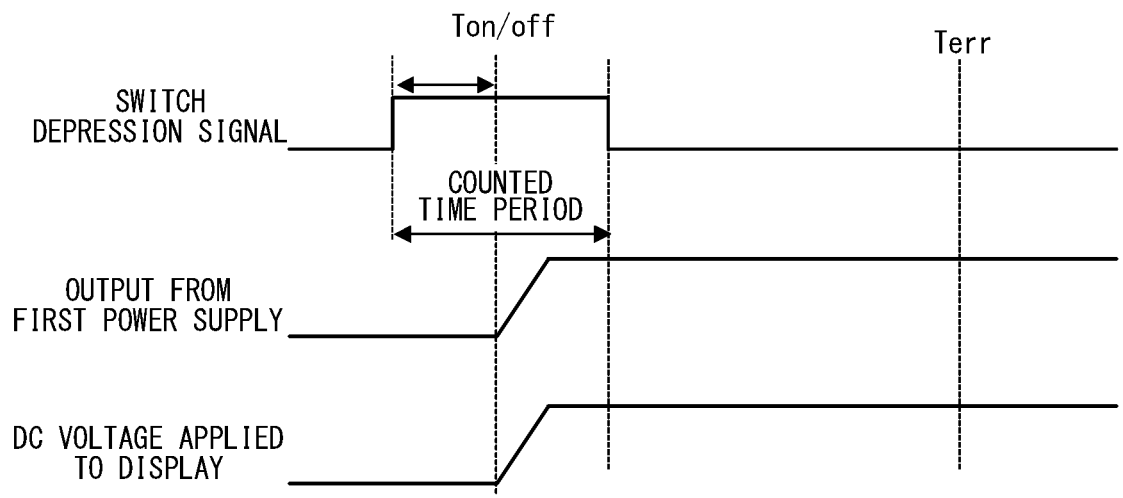
FIG. 5A and FIG. 5B are timing charts obtained when the image forming apparatus is started.
Figure 5B:
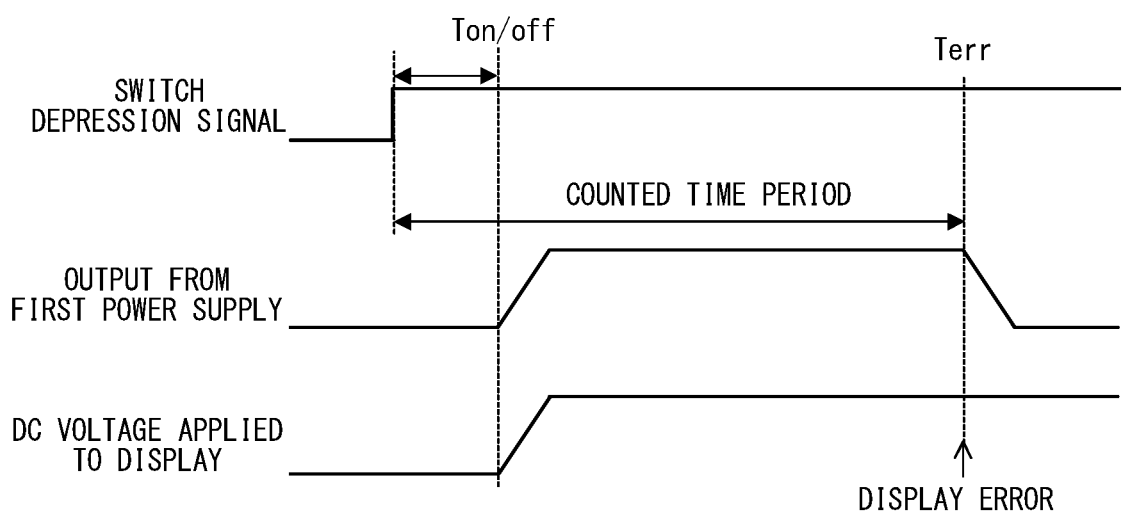

FIG. 5A and FIG. 5B are timing charts obtained upon the image forming apparatus 100 is started. In FIG. 5A and FIG. 5B, timings of the switch depression signal 212, the DC voltage output from the first power supply 207, and the DC voltage applied to the display 101 are illustrated. FIG. 5A is a timing chart obtained in the case of normal operation. FIG. 5B is a timing chart obtained in a case where the main power switch 103 has failed.

In the case where the main power switch 103 operates normally, in a case where the main power switch 103 is depressed, the switch depression signal 212 changes from the low level to the high level. At a timing at which a period of high level has continued for the time period Ton/off, the first power supply 207 is activated, and the DC voltage is applied to the display 101. In a case where the switch depression signal 212 changes from the high level to the low level with the period of high level being less than the time period Terr, each of the first power supply 207 and the display 101 enters an active state.

In the case where the main power switch 103 has failed, the timings from when the first power supply 207 is activated to when the DC voltage is applied to the display 101 are the same as in the case in which the main power switch 103 normally operates. In a case where the switch depression signal 212 remains at the high level after the time period Terr has elapsed, the CPU 202 determines that the main power switch 103 has failed, and forcefully deactivates the first power supply 207. The display 101 remains in the active state with the DC voltage being applied thereto because it is required for the display 101 to display the message.

(Timing Charts Upon Shutdown)

Figure 6A:
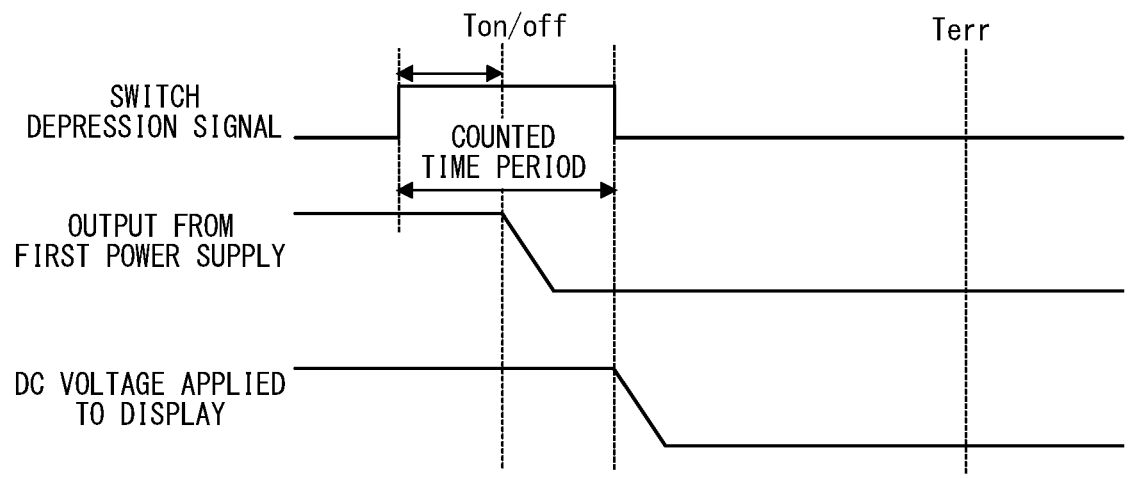
FIG. 6A and FIG. 6B are timing charts obtained when the image forming apparatus is stopped.
Figure 6B:
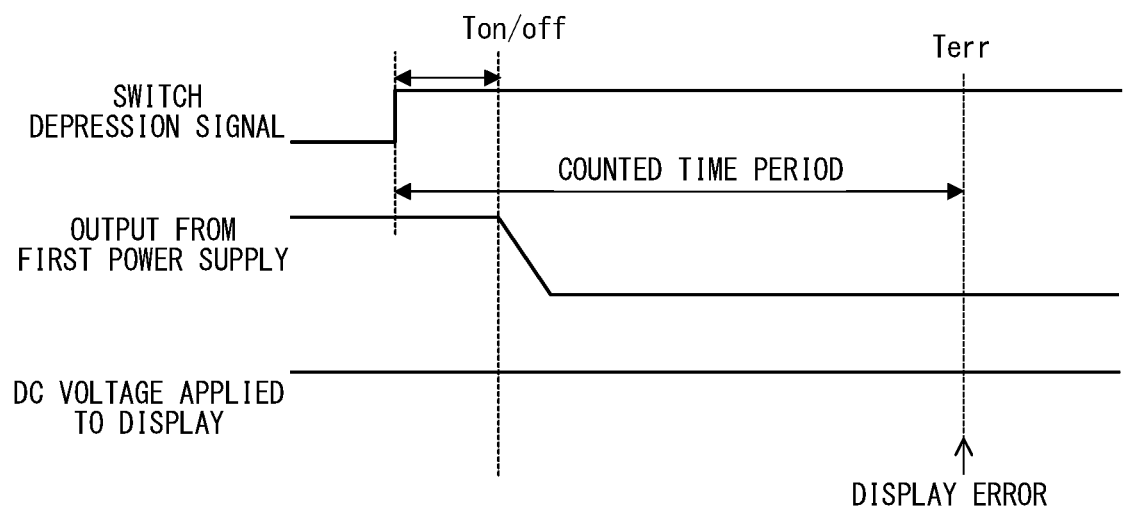

FIG. 6A and FIG. 6B are timing charts obtained upon the image forming apparatus 100 is shut down. In FIG. 6A and FIG. 6B, timings of the switch depression signal 212, the DC voltage output from the first power supply 207, and the DC voltage applied to the display 101 are illustrated. FIG. 6A is a timing chart obtained in the case of normal operation. FIG. 6B is a timing chart obtained in a case where the main power switch 103 has failed.

In the case where the main power switch 103 operates normally, in a case where the main power switch 103 is depressed, the switch depression signal 212 changes from the low level to the high level. At a timing at which a period of high level has continued for the time period Ton/off, the first power supply 207 is deactivated. In a case where the switch depression signal 212 changes from the high level to the low level, and the period of high level is less than the time period Terr, the application of the DC voltage to the display 101 is ended. The display 101 is deactivated at the time in a case where there is no fear that the main power switch 103 fails.

In the case where the main power switch 103 has failed, the timings to in a case where the first power supply 207 is deactivated are the same as in the case in which the main power switch 103 normally operates. In a case where the switch depression signal 212 remains at the high level after the time period Terr has elapsed, the CPU 202 determines that the main power switch 103 has failed. The display 101 remains in the active state with the DC voltage being applied thereto because it is required for the display 101 to display the message.

The power supply control device of the image forming apparatus 100 according to this embodiment described above determines that the main power switch 103 has failed in a case where the main power switch 103, which outputs the switch depression signal 212 in one state when it is not depressed, has been depressed and the switch depression signal 212 remains the one state for the predetermined time period. In this case, the power supply control device forcefully stops applying the DC voltage to the load 209, to thereby prevent the situation in which the operation of the load 209 cannot be stopped due to the failure of the main power switch 103. Further, the power supply control device displays the message which indicates that the main power switch 103 has failed on the display 101. Therefore, the user can determine what part of the apparatus has failed. As described above, according to this embodiment, even when the main power switch 103 has failed, the failure can be detected and the apparatus can be shut down.

In this embodiment, there is adopted the configuration in which the application state of the DC voltage to the load 209 is switched in a case where the switch depression signal 212 has changed from the low level to the high level and is continuously at the high level for the predetermined time period (time period Ton/off) or more. Alternatively, the timing at which the application state of the DC voltage to the load 209 is switched may be a timing at which the switch depression signal 212 changes from the high level to the low level, for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073025, filed Apr. 5, 2019, which is hereby incorporated by reference herein in its entirety.

What is claimed is:

1. A power supply control device comprising:
a switch configured to output a switch depression signal, which is in a first logic level during a period in which the switch is not depressed, and is in a second logic level during a period in which the switch is depressed;
a first power supply configured to generate a first DC voltage based on AC power, which is supplied from an outside, and to apply the first DC voltage to a predetermined load;
a second power supply configured to generate a second DC voltage based on the AC power irrespective of a state of the switch; and
a controller configured to operate on the second DC voltage, to switch an operation state of the first power supply in a case where the switch depression signal has switched from the first logic level to the second logic level and thereafter the switch depression signal remains at the second logic level until a first predetermined time period has elapsed, and to output a signal on a failure of the switch in a case where the switch depression signal has switched from the first logic level to the second logic level and thereafter the switch depression signal remains at the second logic level until a second predetermined time period has elapsed, the second predetermined time period being longer than the first predetermined time period.

2. The power supply control device according to claim 1, further comprising a display,
wherein the controller is configured to output, as the signal on the failure of the switch, a signal for causing the display to display a message which indicates that the switch has failed.

3. The power supply control device according to claim 2, further comprising an energization controller provided on a supply path, through which the second DC voltage is applied from the second power supply to the display, to control energization of the display with the second DC voltage,
wherein the controller is configured to control conduction of the energization controller depending on a time period during which the second logic level continues from when the switch depression signal has switched from the first logic level to the second logic level, to thereby control an operation state of the display.

4. The power supply control device according to claim 3, wherein the controller is configured to activate the first power supply and conduct the energization controller to activate the display in a case where, under an inactive state of the first power supply, the switch depression signal has switched from the first logic level to the second logic level and thereafter the switch depression signal remains at the second logic level until the first predetermined time period has elapsed, and to cause the display to display the message which indicates that the switch has failed and deactivate the first power supply in a case where the switch depression signal has switched from the first logic level to the second logic level and thereafter the switch depression signal remains at the second logic level until the second predetermined time period has elapsed.

5. The power supply control device according to claim 4, wherein the controller is configured to activate the first power supply and the display in a case where the switch depression signal has switched from the first logic level to the second logic level and thereafter the switch depression signal switches to the first logic level before the second predetermined time period has elapsed.

6. The power supply control device according to claim 3, wherein the controller is configured to deactivate the first power supply in a case where, under an active state of the first power supply, the switch depression signal has switched from the first logic level to the second logic level and thereafter the switch depression signal remains at the second logic level until the first predetermined time period has elapsed, and to cause the display to display the message which indicates that the switch has failed in a case where the switch depression signal has switched from the first logic level to the second logic level and thereafter the switch depression signal remains at the second logic level until the second predetermined time period has elapsed.

7. The power supply control device according to claim 6, wherein the controller is configured to cut off the energization controller to deactivate the display in a case where the switch depression signal has switched from the first logic level to the second logic level and thereafter the switch depression signal switches to the first logic level before the second predetermined time period has elapsed.

8. The power supply control device according to claim 1, wherein the controller is configured to:
   count a time period during which the switch depression signal is continuously at the second logic level; and
   switch the operation state of the first power supply in a case where the counted time period reaches the first predetermined time period, and deactivate the first power supply in a case where the counted time period then reaches the second predetermined time period.

9. The power supply control device according to claim 8, wherein the controller is configured to clear the counted time period to 0 and end the counting in a case where the switch depression signal switches from the second logic level to the first logic level before the counted time period reaches the second predetermined time period.

10. The power supply control device according to claim 8, wherein the controller is configured to clear the counted time period to 0 and end the counting in a case where the switch depression signal switches from the second logic level to the first logic level before the counted time period reaches the first predetermined time period.

11. An image forming apparatus comprising:
a load to be used in forming an image;
a switch configured to output a switch depression signal, which is in a first logic level during a period in which the switch is not depressed, and is in a second logic level during a period in which the switch is depressed;
a first power supply configured to generate a first DC voltage based on AC power, which is supplied from an outside, and apply the first DC voltage to the load;
a second power supply configured to generate a second DC voltage based on the AC power irrespective of a state of the switch; and
a controller configured to operate on the second DC voltage, to switch an operation state of the first power supply in a case where the switch depression signal has switched from the first logic level to the second logic level and thereafter the switch depression signal remains at the second logic level until a first predetermined time period has elapsed, and to output a signal on a failure of the switch in a case where the switch depression signal has switched from the first logic level to the second logic level and thereafter the switch depression signal remains at the second logic level until a second predetermined time period has elapsed, the second predetermined time period being longer than the first predetermined time period.

* * * * *